United States Patent Office 2,816,120
Patented Dec. 10, 1957

2,816,120

9α-FLUORO-4,11β-DIHYDROXYPROGESTERONE AND PROCESS

Josef Fried, New Brunswick, N. J., assignor to Olin Mathieson Chemical Corporation, New York, N. Y., a corporation of Virginia No Drawing. Application April 2, 1956,
Serial No. 575,309

5 Claims. (Cl. 260—397.45)

This invention relates to, and has for its object, the provision of steroids of the general formula

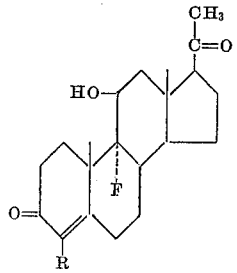

wherein R is hydroxy or acyloxy, particularly acyloxy radicals of hydrocarbon carboxylic acids having less than ten carbon atoms, exemplified by the lower alkanoic acids (e. g. acetic, propienic, butyric and enanthic acid), the monocyclic aromatic carboxylic acids (e. g. benzoic, toluic and xyloic acid) and the monocyclic aralkanoic acids (e. g. α-toluic and phenylacetic acid). These compounds are pharmacologically-active steroids, useful as glucocorticoids. Hence the new steroids of this invention can be used in lieu of known glucocorticoids, and may be administered instead of, and in the same manner as, cortisone or hydrocortisone in the treatment of rheumatoid arthritis and dermatomyositis. The dosage for such administration is, of course, dependent on the relative activity of the compound.

The compounds of this invention are prepared from 9α-fluoro-11β-hydroxyprogesterone, by interacting the latter with osmium tetroxide in an inert solvent (e. g. ether and dioxane) in the presence of a basic catalyst (e. g. pyridine). The osmic acid ester initially formed is then decomposed to 9α-fluoro-4α,5α,11β-trihydroxy 3,20-diketopregnane by treatment with a reducing agent, such as sodium sulfite in water, and the resultant 4α,5α-dihydroxypregnane is then treated with a base, such as an alkali metal hydroxide in an organic solvent (e. g. potassium hydroxide in methanol) to yield the 9α-fluoro-4,11β-dihydroxyprogesterone. The 9α-fluoro-4,11β-dihydroxyprogesterone, thus formed, can then be esterified by treatment with an acylating agent such as an acyl halide or acid anhydride, preferably in an organic solvent (optimally in an organic base such as pyridine) to give the corresponding 4-acyloxy derivative. The preferred acylating agents are those of organic hydrocarbon carboxylic acids containing less than ten carbon atoms, exemplified by the acyl chlorides and acid anhydrides of lower alkanoic acids, monocyclic aromatic carboxylic acids and monocyclic aralkanoic acids.

The following examples are illustrative of the invention (all temperatures being in centigrade):

EXAMPLE 1

*Osmic acid ester of 9α-fluoro-pregnane-4α,5α,11β-triol-3,20-dione*

To a solution of 100 mg. of 9α-fluoro-11β-hydroxyprogesterone in 1.5 ml. of dioxane and 3.5 ml. of ether is added 91 mg. of osmium tetroxide and 0.1 ml. of anhydrous pyridine. The reaction mixture is allowed to remain at room temperature in the dark for 24 hours and the dark brown precipitate is filtered off and washed with ether. The dried material (about 180 mg.) consists of the osmic acid ester of 9α-fluoro-pregnane-4α,5α,11β-triol-3,20-dione having the structural formula

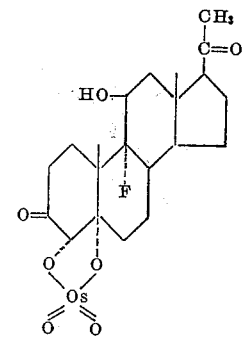

EXAMPLE 2

*9α-fluoropregnane-4α,5α,11β-triol-3,20-dione*

180 mg. of the osmic acid ester of 9α-fluoro pregnane-4α,5α,11β-triol-3,20-dione formed by the procedure of Example 1 is dissolved in 2.5 ml. of dioxane and a solution of 600 mg. of sodium sulfite in 4.3 ml. of water is added. The mixture is refluxed for 20 minutes and after cooling 10 ml. of chloroform is added. The black precipitate is filtered off and washed with chloroform. The filtrate layers are separated, the aqueous phase washed with chloroform and the combined chloroform extracts washed with water. After drying over sodium sulfate, the solution is evaporated to dryness and the residue (about 80 mg.) is dissolved in 5 ml. of chloroform and 15 ml. of benzene for chromatography on 1.6 g. of sulfuric acid washed alumina. Elution of the column with chloroform-benzene 1:4 (700 ml.) and chloroform-benzene 1:1 (300 ml.) furnishes 9α-fluoropregnane-4α,5α,11β-triol-3,20-dione, which after three crystallizations from ethyl acetate has the following properties: M. P. 241–244°; $[\alpha]^{23}$ D 86° (c. 0.54 in $CHCl_3$);

$\lambda_{max}^{alc.}$ no selective absorption at 240 m$\mu$.

Analysis.—Calcd. for $C_{21}H_{39}O_5F$ (382.45): C, 65.95; H, 8.16. Found: C, 65.99; H, 7.87.

EXAMPLE 3

*9α-fluoro-4,11β-dihydroprogesterone*

A solution of 25 mg. of 9α-fluoropregnane-4α,5α,11β-triol-3,20-dione in 2 ml. of 2.5% KOH in methanol is allowed to stand at room temperature for 2 hours. At the end of this period water is added and the mixture extracted with chloroform. The chloroform solution is extracted with water and dried over sodium sulfate. Evaporation of the solvent in vacuo gives 9α-fluoro-$\Delta^4$-pregnene-4,11β-diol-3,20-dione. The substance gives a green coloration with ferric chloride.

EXAMPLE 4

*9α-fluoro-4-acetoxy-11β-hydroxyprogesterone*

A solution of 25 mg. of 9α-fluoro-4,11β-dihydroxyprogesterone in 0.25 ml. of pyridine and 0.25 ml. of acetic anhydride is allowed to remain at room temperature for 20 hours. At the end of that period the reagents are removed in vacuo, and the crystalline residue recrystallized from acetone-hexane to yield pure 9α-fluoro-4-acetoxy-11β-hydroxyprogesterone.

Similarly, by substituting other acylating agents for the acetic anhydride of Example 4, the corresponding ester derivatives are formed. Thus, propionic anhydride, n-heptanoic anhydride, benzoyl chloride and α-toluyl chloride yield their respective 4-acyloxy derivatives.

The invention may be variously otherwise embodied within the scope of the appended claims.

I claim:
1. A compound of the general formula

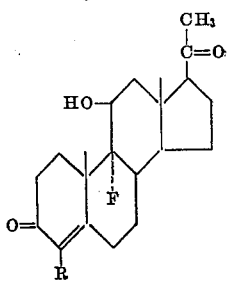

wherein R is selected from the group consisting of hydroxy and an acyloxy of an organic hydrocarbon carboxylic acid having less than ten carbon atoms.

2. 9α-fluoro-4,11β-dihydroxyprogesterone.
3. 9α-fluoropregnane-4α,5α,11β-triol,3,20-dione.
4. The osmic acid ester of 9α-fluoro pregnane-4α,5α,11β-triol-3,20-dione.
5. The process for preparing 9α-fluoro-4,11β-dihydroxyprogesterone which comprises interacting 9α-fluoro-11β-hydrodyprogesterone and osmium tetroxide, decomposing the resulting osmic acid ester, and dehydrating the resulting 4α,5α-diol by treatment with a base.

References Cited in the file of this patent
UNITED STATES PATENTS

| | | |
|---|---|---|
| 2,707,190 | Farrar | Apr. 26, 1955 |
| 2,727,912 | Colton | Dec. 20, 1955 |